US012421797B2

(12) United States Patent
Kim et al.

(10) Patent No.: US 12,421,797 B2
(45) Date of Patent: Sep. 23, 2025

(54) COMBINATION ROLLER BLIND WITH FINE ADJUSTMENT FUNCTION FOR SHADING

(71) Applicants: Phillip Hyun Kim, Upland, CA (US); Kevin Kim, Upland, CA (US)

(72) Inventors: Phillip Hyun Kim, Upland, CA (US); Kevin Kim, Upland, CA (US)

( * ) Notice: Subject to any disclaimer, the term of this patent is extended or adjusted under 35 U.S.C. 154(b) by 257 days.

(21) Appl. No.: 18/206,786

(22) Filed: Jun. 7, 2023

(65) Prior Publication Data

US 2024/0117672 A1 Apr. 11, 2024

(30) Foreign Application Priority Data

Oct. 7, 2022 (KR) ........................ 10-2022-0128509

(51) Int. Cl.

*E06B 9/44* (2006.01)
*E06B 9/78* (2006.01)
*E06B 9/24* (2006.01)
*E06B 9/40* (2006.01)

(52) U.S. Cl.

CPC .................. *E06B 9/44* (2013.01); *E06B 9/78* (2013.01); *E06B 2009/2405* (2013.01); *E06B 2009/2458* (2013.01); *E06B 2009/405* (2013.01); *E06B 2009/785* (2013.01)

(58) Field of Classification Search

CPC ..... E06B 9/40; E06B 9/44; E06B 9/78; E06B 2009/2405; E06B 2009/2458; E06B 2009/405; E06B 2009/785; E06B 2009/2447

See application file for complete search history.

(56) References Cited

U.S. PATENT DOCUMENTS

| | | | | |
|---|---|---|---|---|
| 6,189,592 B1 * | 2/2001 | Domel | E06B 9/24 160/241 |
| 9,631,422 B1 * | 4/2017 | Chen | E06B 9/42 |
| 11,208,842 B2 * | 12/2021 | Kwon | E06B 9/78 |
| 2006/0021715 A1 * | 2/2006 | Nien | E06B 9/50 160/121.1 |
| 2009/0173454 A1 * | 7/2009 | Cheng | E06B 9/40 160/319 |
| 2022/0304493 A1 * | 9/2022 | Wang | A47H 1/06 |
| 2022/0412161 A1 * | 12/2022 | Strand | E06B 9/40 |
| 2023/0332465 A1 * | 10/2023 | Dimitrakoudis | E06B 9/42 |

* cited by examiner

*Primary Examiner* — Beth A Stephan
(74) *Attorney, Agent, or Firm* — PARK LAW FIRM

(57) ABSTRACT

The present invention relates to a combination roller blind wherein a fine adjustment means is provided behind an upper face of a headrail, the adjustment means causing an end of a blind sheet wrapped around a blind roll and an end opposite thereof to be fine-adjustably wrapped and unwrapped. When the blind is installed on a ceiling or a window frame to completely conceal the bottom edge of the window so that a bottom edge of a weight is adjoining a bottom sill of the window frame, and a portion of a light-transmissive section of the blind sheet is not overlapped, the opposite edge wrapped around the blind roll of the blind sheet can be fine-adjusted by rolling so that the light-transmissive section alternates with and is not completely overlapped by a light blocking section, allowing for complete shading to be achieved while completely concealing the bottom edge of the window.

7 Claims, 9 Drawing Sheets

COMBINATION ROLLER BLIND WITH FINE ADJUSTMENT FUNCTION FOR SHADING

TECHNICAL FIELD

The present invention relates to a combination roller blind with fine adjustment function for shading. More specifically, the present invention relates to a combination roller blind wherein a fine adjustment means is provided behind an upper face of a headrail, the adjustment means causing an end of a blind sheet wrapped around a blind roll and an end opposite thereof to be fine-adjustably wrapped and unwrapped. When [the blind] is installed on a ceiling or a window frame to completely conceal the bottom edge of the window so that a bottom edge of a weight is adjoining a bottom sill of the window frame, and a portion of a light-transmissive section of the blind sheet is not overlapped, the opposite edge wrapped around the blind roll of the blind sheet can be fine-adjusted by rolling so that the light-transmissive section alternates with and is not completely overlapped by a light blocking section, allowing for complete shading to be achieved while completely concealing the bottom edge of the window. By allowing the opposite edge of the blind sheet wrapped around the blind sheet to be fine-adjusted, [the blind] may be installed on window frames having varying lengths so that complete shading can be achieved when a weight is moved down to its lowest extent, maximizing compatibility with installation sites.

BACKGROUND ART

Typically, a roller blind is an interior apparatus which is installed over a transparent glass window or glass wall to keep light from entering from outside to adjust the indoor atmosphere, or to hide the interior from the outside.

A roller blind is comprised of: a headrail secured to a ceiling or a window frame; a blind roll attached to the headrail; a blind sheet wrapped around the blind roll; a roller that wraps and unwraps the blind sheet; and an adjusting cord for rotating the roller.

In the above-described roll blind, when a user manipulates the adjusting cord, the roller rotates the blind roll to lower or raise the blind sheet to allow light to enter or block light as needed by the user.

Meanwhile, first, a single type roll blind wherein a single roll blind sheet is wrapped around a single blind roll to block light has been developed and is being used. Another type that has been developed and is in use is the combination roll blind, wherein two layers of blind sheets are installed with light-transmissive sections formed at equal intervals on the blind sheets so that when the blind sheets are raised and lowered, respectively, light is either blocked or allowed through [without lowering or raising the weight], keeping the interior concealed while allowing light to be partially blocked.

Here, in the above-described combination roll blind, one end of the blind sheet is attached to the headrail, and the other end of the blind sheet is wrapped around the blind roll, and the bottom edge [where the blind sheet folds over itself] is weighed down and kept unwrapped by the weight.

In other words, in the above-described combination roller blind according to prior art, when the user pulls the adjusting cord, the blind roll rotates and winds the blind sheet, causing the light-transmissive sections of the forward and rear [halves] of the blind sheet to overlap and allow light to partially pass through, and if the light-transmissive sections of the forward and rear [halves] of the blind sheet do not overlap, light remains blocked.

However, in the above-described combination roller blind according to prior art, whereas when the blind is installed on a ceiling or a window frame and the weight has been manipulated to adjoin the bottom sill of the window frame and completely conceal the bottom of the window, the light-transmissive sections of the forward and rear [halves] of the blind sheet must not overlap, there is the problem that part of the light-transmissive sections overlap.

Also, because of the problem that, when the blind is installed on a ceiling or a window frame and the weight has been manipulated to adjoin the bottom sill of the window frame and completely conceal the bottom of the window, the light-transmissive sections of the forward and rear [halves] of the blind sheet must not overlap, part of the light-transmissive sections do overlap, there is the problem that when the weight is lowered to the lowest extent, outside light is not completely blocked.

Moreover, adjusting the blind sheet so that the light-transmissive sections do not overlap requires the cumbersome work of cutting the end of the blind sheet fixed to the headrail. Also, as the blind sheet must be cut to a length corresponding to the length of the window frame, etc., where the blind is to be installed, mass producibility is limited, and the inability to install on various window frames means severely limited compatibility.

Therefore, research and development is required for a combination roll blind where, in a case when the blind is installed on a ceiling or a window frame and the weight has been manipulated to adjoin the bottom sill of the window frame and completely conceal the bottom of the window, part of the light-transmissive sections of the forward and rear overlap, the opposite end of the blind sheet wrapped around the blind roll can conveniently be fine-adjusted by rolling so that the light-transmissive sections do not overlap, allowing for light to be completely blocked while completely concealing the bottom sill of the window, and where, by allowing for the opposite end of the blind sheet wrapped around the blind roll to be fine-adjusted by rolling, [the blind] can be installed to completely block out light when the weight is lowered to the lowest extent on window frames of various length, maximizing compatibility with installation sites.

PRIOR ART LITERATURE

Patent Literature (Patent Literature 1) Korean Laid-open Patent No. 10-2013-0062561, laid-open Jun. 13, 2013.

(Patent Literature 2) Korean Registered Patent No. 10-1131850, registered Mar. 23, 2012.

(Patent Literature 3) Korean Laid-open Utility Model No. 20-2010-0012924, laid-open Dec. 29, 2010.

(Patent Literature 4) Korean Registered Patent No. 10-1306721, registered Sep. 4, 2013.

(Patent Literature 5) Korean Registered Patent No. 10-1348337, registered Dec. 26, 2013.

SUMMARY OF THE INVENTION

Technical Problem

To solve the above-described problems, an object of the present invention is to provide a fine-adjustable combination roller blind wherein a fine adjustment means is provided behind an upper face of a headrail, the adjustment means causing an end of a blind sheet wrapped around a blind roll and an end opposite thereof to be fine-adjustably wrapped and unwrapped, and where, when [the blind] is installed on a ceiling or a window frame to completely conceal the bottom edge of the window so that a bottom edge of a weight is adjoining a bottom sill of the window frame, and a portion of a light-transmissive section of the blind sheet is not overlapped, the opposite edge wrapped around the blind roll of the blind sheet can be fine-adjusted by rolling so that the light-transmissive section alternates with and is not completely overlapped by a light blocking section, allowing for complete shading to be achieved while completely concealing the bottom edge of the window.

Another object of the present invention is to, by allowing the opposite edge of the blind sheet wrapped around the blind sheet to be fine-adjusted, allow a blind to be installed on window frames having varying lengths so that complete shading can be achieved when a weight is moved down to its lowest extent, maximizing compatibility with installation sites.

Technical Solution

The present invention, to achieve the above-stated objects, is as follows. That is, the combination roller blind with a fine adjustment function for shading according to the present invention is comprised of: a headrail whose upper face is fixedly installed on a ceiling or a window frame, and which is formed by a front portion and an upper portion of certain length and width joined at a right angle, where the open side faces are sealed by inserting a side cover; a blind roll whose ends are rotatably fixed to a pair of fixed axes, where one side of each axis is fixed in place by a bottom end of a fixed frame whose top end is fixed to the upper face; a blind sheet on which light-transmissive sections and light-blocking sections are formed alternatingly in a lengthwise direction, where one end is fixed to the blind roll for winding or unwinding, and the other end is fine-adjustably fixed to a rearward face of the upper portion of the headrail to allow winding or unwinding; a weight which is installed at a U-shaped bottom curve of the blind sheet and which guides the rising of the blind sheet and maintains tension thereof; a fine-adjusting means which is installed to span the rearward face of the upper portion of the headrail and a side cover of any one side, and to which the opposite end of the blind sheet is fixed and is wound or unwound to be rotated a certain distance to fine-adjust the blind sheet so that a state wherein some of the light-transmissive sections overlap becomes a state wherein [the light-transmissive sections] do not overlap; a roller which is assembled to wrap around a fixed axis provided on the other side of the head rail to which a side cover is assembled, and which rotates the blind roll to move the blind sheet; and an adjusting cord whose forward or rearward section is pulled down to rotate the roller to raise or lower the blind sheet.

Here, the fine-adjusting means is installed to span the rearward face of the upper portion of the headrail and a side cover of any one side, and is comprised of an adjustment housing which a hollow tube whose upper edge is fixed to a rear section of the upper portion of the headrail, and on which a downward-inclined lower portion facing the front portion of the headrail is cut out over a certain distance in a circumferential direction, and a fine-adjustable winding bar which is provided as a hollow tube whose internal space is divided into two parts, each divisional space having a cut-out in communication with the outside, where a certain length of the opposite end of the blind sheet is fixed by insertion into the cut-out on any one side, and which is rotated to wind or unwind the opposite end of the blind sheet; an adjusting hole which is penetratingly formed through a rearward top corner of a side cover on any one side in communication with the internal space of the adjustment housing; and a fine-adjusting tool which is fixed by insertion into the adjusting hole so that one end is inserted into the divisional space of the fine-adjustable winding bar opposite the space into which the opposite end of the blind sheet is inserted, and which is detached from the adjusting hole by a certain length and rotated to cause the fine-adjustable winding bar to rotate in interlock.

Further, to stably prevent rotation of the fine-adjusting tool after it has been rotated, the fine-adjusting tool is comprised of an insertion piece which is provided as an arc-shaped projection which is inserted into the divisional space of the fine-adjustable winding bar opposite the space into which the opposite end of the blind sheet is inserted; and an adjusting portion comprised of a disc-shaped separator which is formed integrally to extend outward from the cylindrical shape at one end of the insertion piece and have a height difference from the opposite end of the insertion piece. Preferably, gear projections are formed on the outer face of the cylindrical shape on one end of the adjusting portion, while gear grooves are formed on the inner face of the adjusting hole so that when the fine-adjusting tool is inserted, [the gear grooves] mesh with the gear projections of the adjusting portion.

Further, the separator preferably has a depressed tool insertion groove of a certain width on one side, into which a tool is inserted to allow the fine-adjusting tool to readily be pulled out by a certain distance.

Further, the weight is comprised of a bottom rod which is wrapped around by the U-shaped bottom curve of the blind sheet, a bottom bar which is disposed to wrap around the bottom rod wrapped around by the U-shaped bottom curve of the blind sheet excluding a certain width on the top; and caps assembled to either side of the bottom bar to allow both ends of the bottom rod to rotate freely. Preferably, the bottom bar is provided as a bar having gradually increasing thickness from either open top end toward the closed bottom midsection.

Further, the headrail preferably has fastening rails formed on the top and bottom of the front face of the front portion, with a patterned sheet fastened to the front face of the front portion using the fastening rails.

Further, the fixed frame is preferably provided as a ⊏-shaped frame whose upper portion is secured in place by inserting into a fixing slot provided in the middle of the headrail in a widthwise direction, with the bottom portion secured in place by inserting between a multiplicity of inward-projecting fixed projections formed on an inner face of an assembly hole formed in the center of the fixed axis, while the side cover has an oblong shape corresponding to the shape of the vertical portion of the fixed frame, and has a depressed accommodating groove depressed to a certain depth on the face thereof which is assembled facing the headrail.

Further, the headrail preferably has a fixing rail formed beneath and behind the upper portion, while the adjustment housing has a "T"-shaped fastening piece formed on the top and which is fastened by sliding into the fixing rail of the upper portion, so that it may be separably fastened to the upper portion of the headrail through the fixing rail.

Benefit(s) of the Invention

The benefits of the combination roller blind with a fine adjustment function for shading according to the present invention are as follow.

First, by providing a fine adjustment means behind an upper face of a headrail, the adjustment means causing an end of a blind sheet wrapped around a blind roll and an end opposite thereof to be fine-adjustably wrapped and unwrapped, when [the blind] is installed on a ceiling or a window frame to completely conceal the bottom edge of the window so that a bottom edge of a weight is adjoining a bottom sill of the window frame and a portion of a light-transmissive section of the blind sheet is not overlapped, the opposite edge wrapped around the blind roll of the blind sheet can be fine-adjusted by rolling so that the light-transmissive section alternates with and is not completely overlapped by a light blocking section, allowing for complete shading to be achieved while completely concealing the bottom edge of the window.

Second, by allowing the opposite edge of the blind sheet wrapped around the blind sheet to be fine-adjusted, a blind may be installed on window frames having varying lengths so that complete shading can be achieved when a weight is moved down to its lowest extent, maximizing compatibility with installation sites.

BEST MODE(S) FOR CARRYING OUT THE INVENTION

In the following, preferred embodiments of the combination roller blind with a fine adjustment function for shading according to the present invention will be described in detail with reference to the attached drawings.

Figure 1:
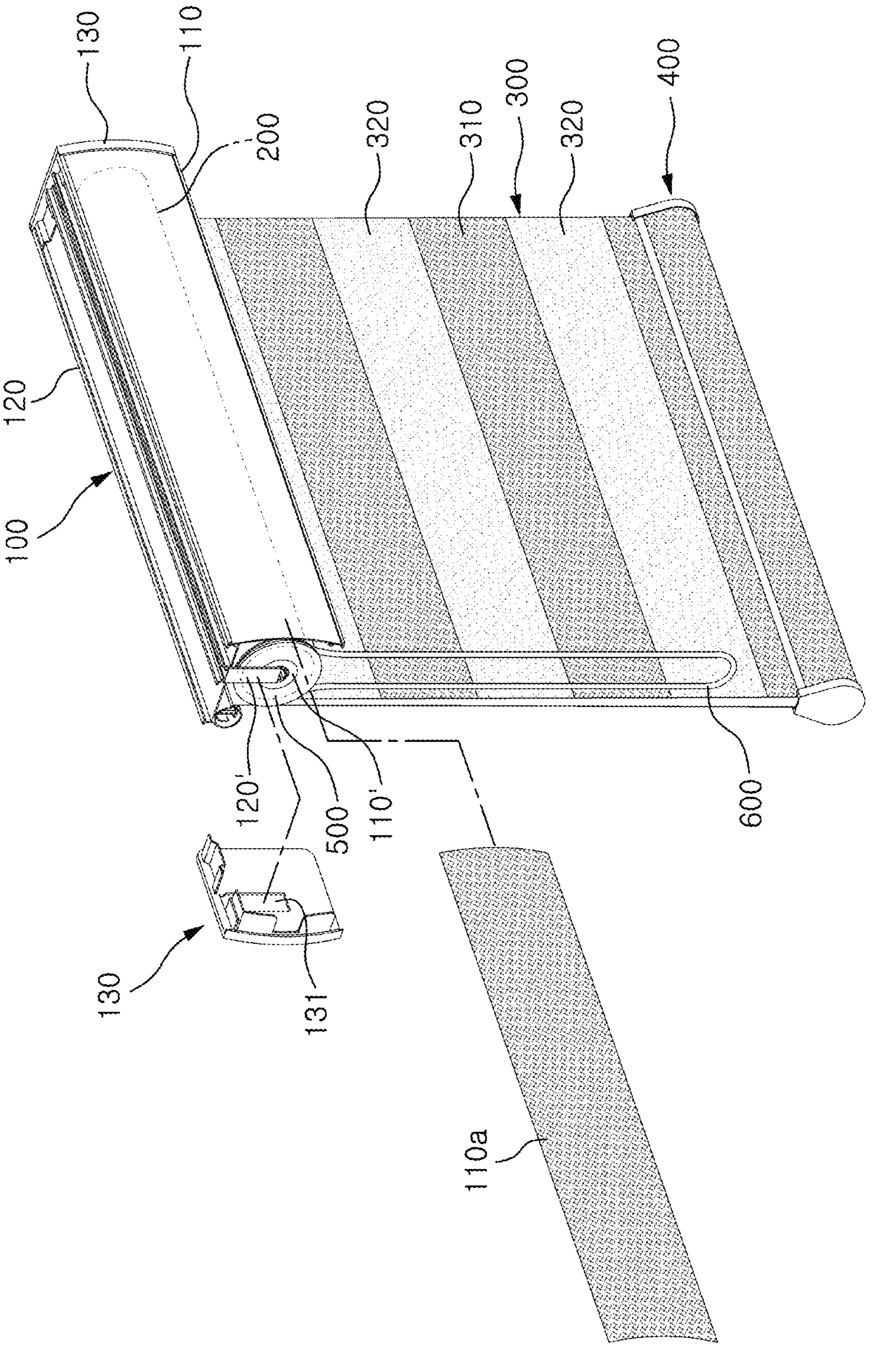
FIG. 1 is a partial exploded perspective diagram illustrating the combination roller blind with a fine adjustment function for shading according to the present invention.
Figure 2A:
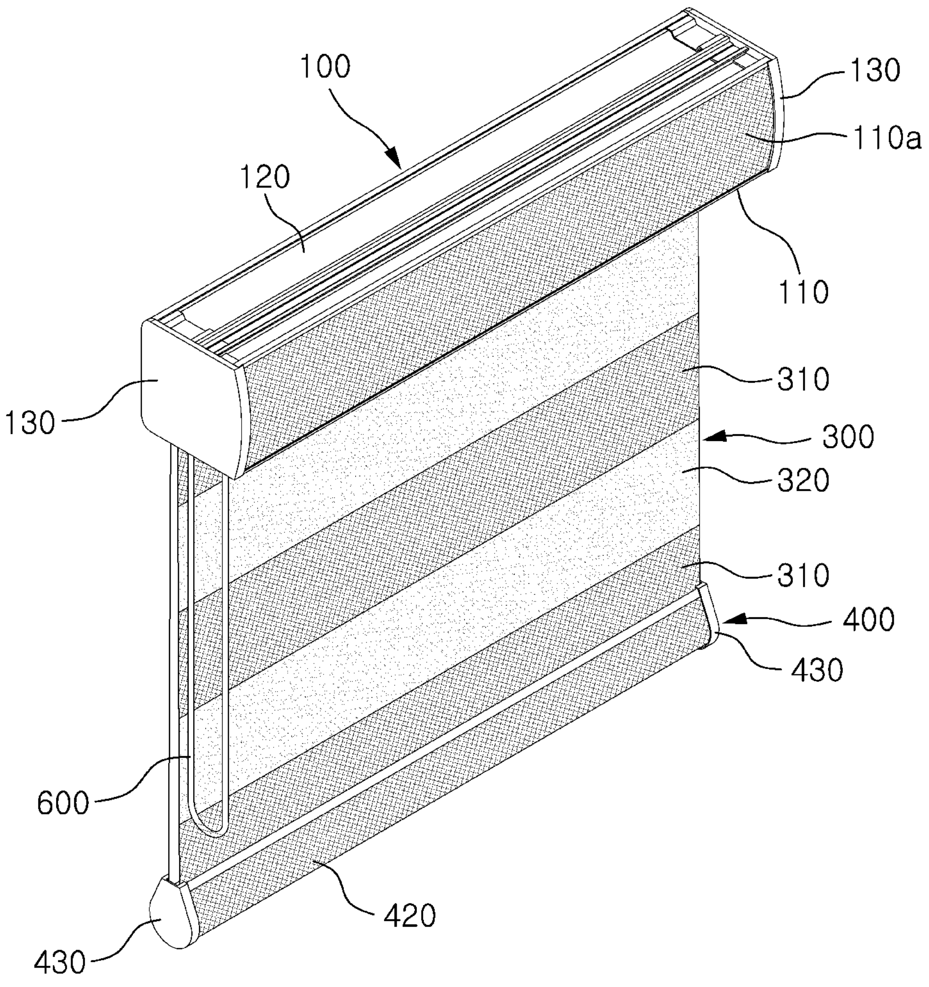
FIG. 2*a* and FIG. 2*b* are assembly perspective diagrams of the combination roller blind with a fine adjustment function for shading according to the present invention.
Figure 2B:
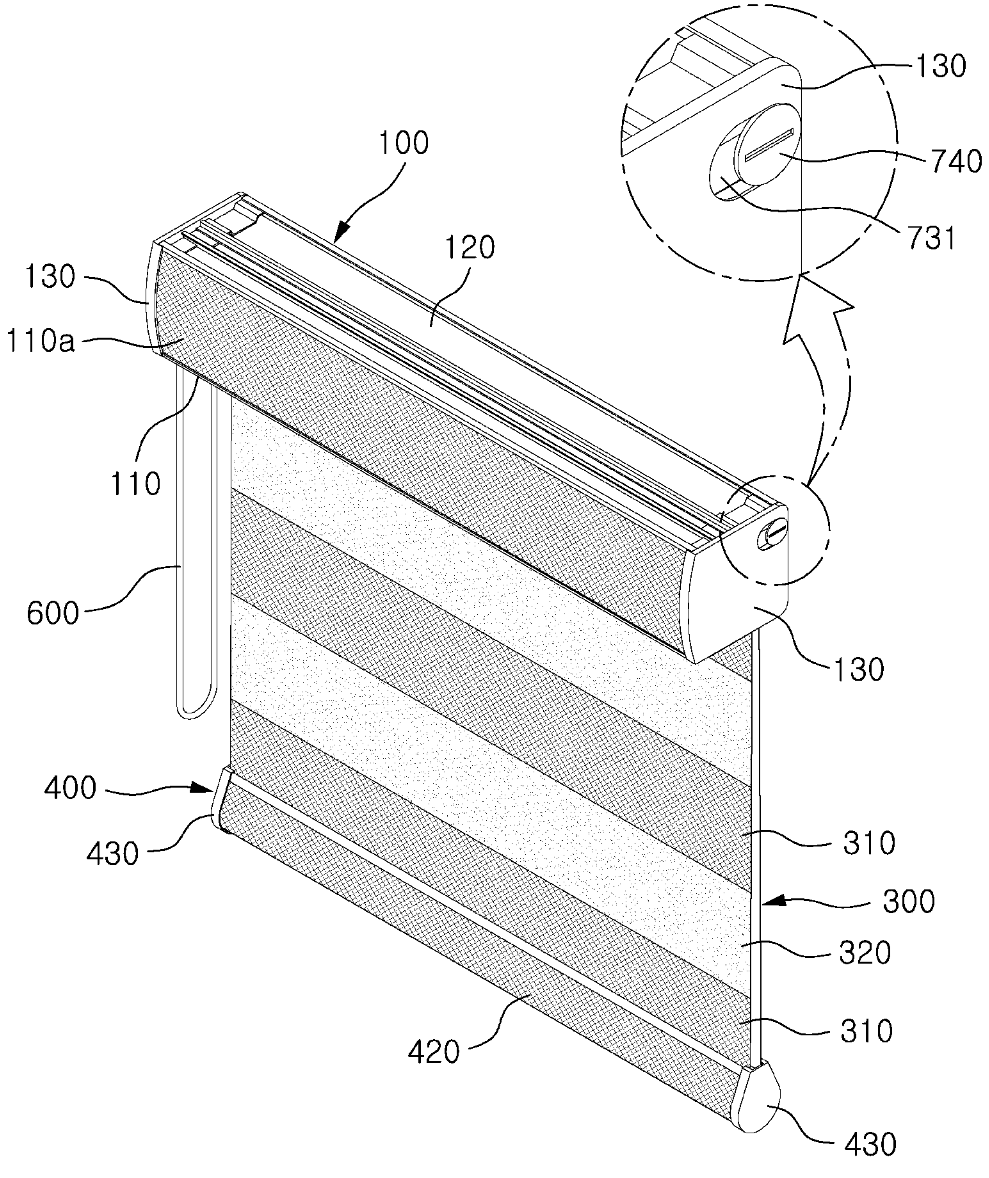

FIG. 1 is a partial exploded perspective diagram illustrating the combination roller blind with a fine adjustment function for shading according to the present invention and FIG. 2*a* and FIG. 2*b* are assembly perspective diagrams of the combination roller blind with a fine adjustment function for shading according to the present invention.

Figure 3:
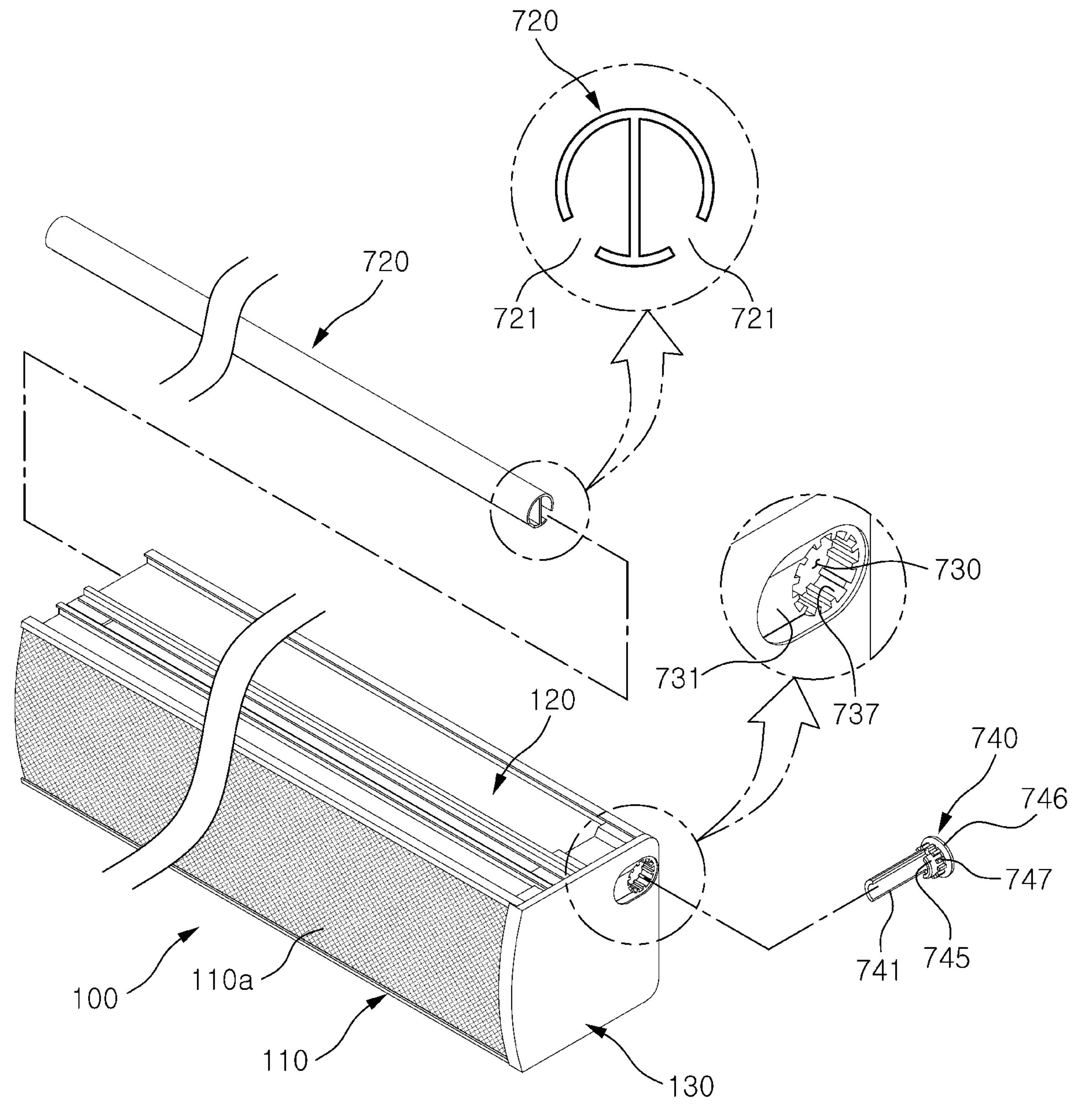
FIG. 3 is an exploded perspective diagram of essential elements illustrating the rotating structure for fine adjustment of the combination roller blind with a fine adjustment function for shading according to the present invention.

FIG. 3 is an exploded perspective diagram of essential elements illustrating the rotating structure for fine adjustment of the combination roller blind with a fine adjustment function for shading according to the present invention.

Figure 4:
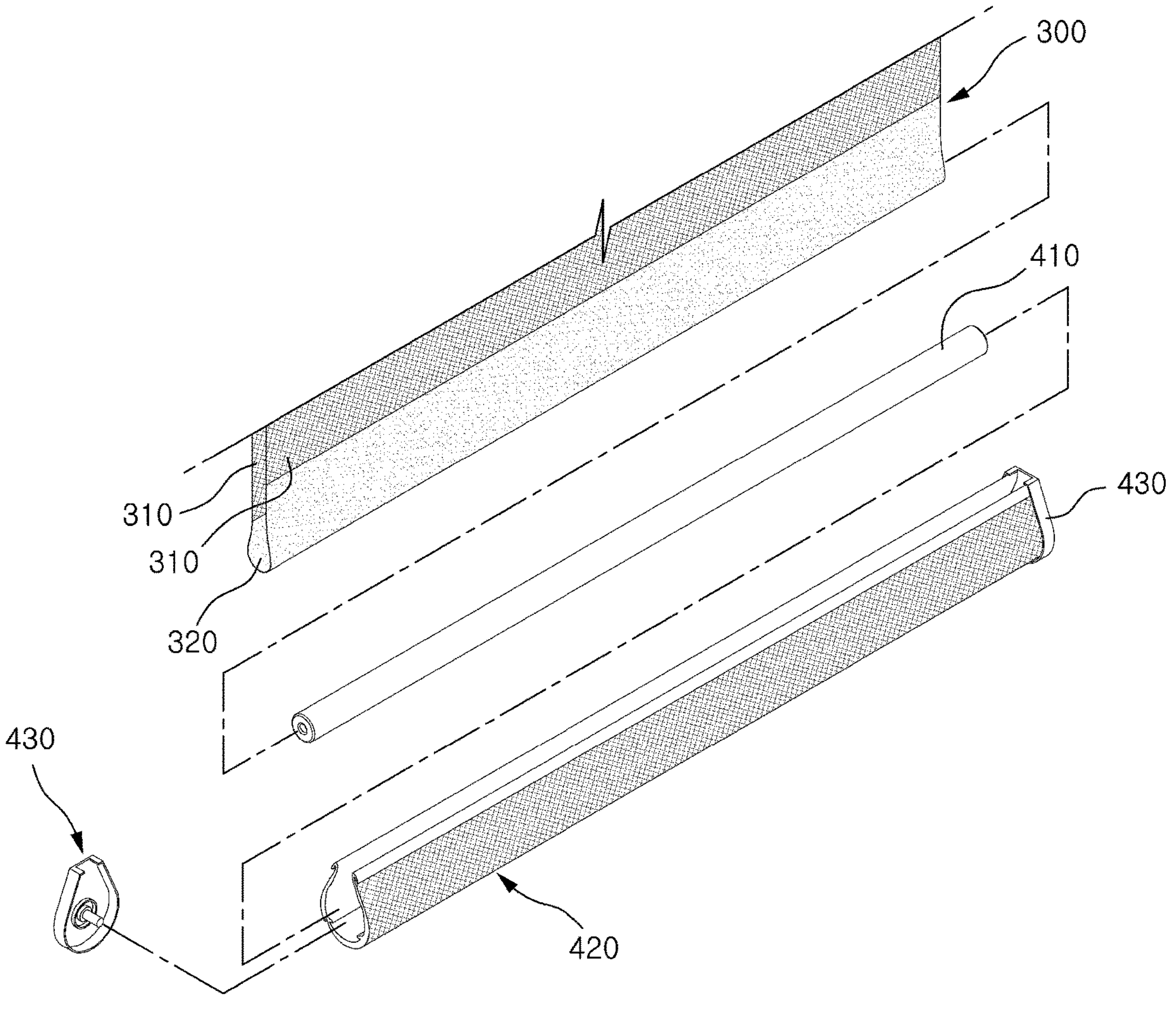
FIG. 4 is an exploded diagram illustrating the lower weight which is an essential element of the combination roller blind with a fine adjustment function for shading according to the present invention.
Figure 5:
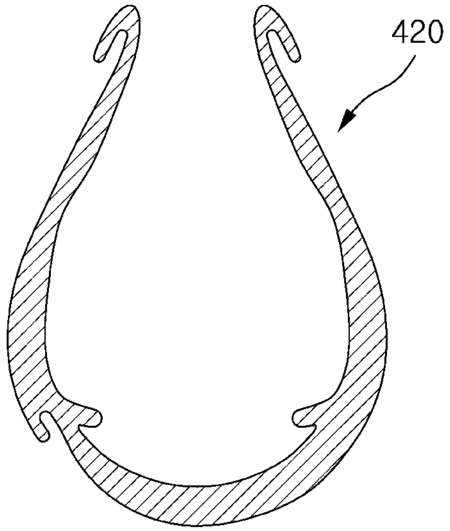
FIG. 5 is a cross-sectional diagram illustrating the cross section of the bottom bar which is an essential element of the weight in FIG. 4.

FIG. 4 is an exploded diagram illustrating the lower weight which is an essential element of the combination roller blind with a fine adjustment function for shading according to the present invention, and FIG. 5 is a cross-sectional diagram illustrating the cross section of the bottom bar which is an essential element of the weight in FIG. 4.

Figure 6:
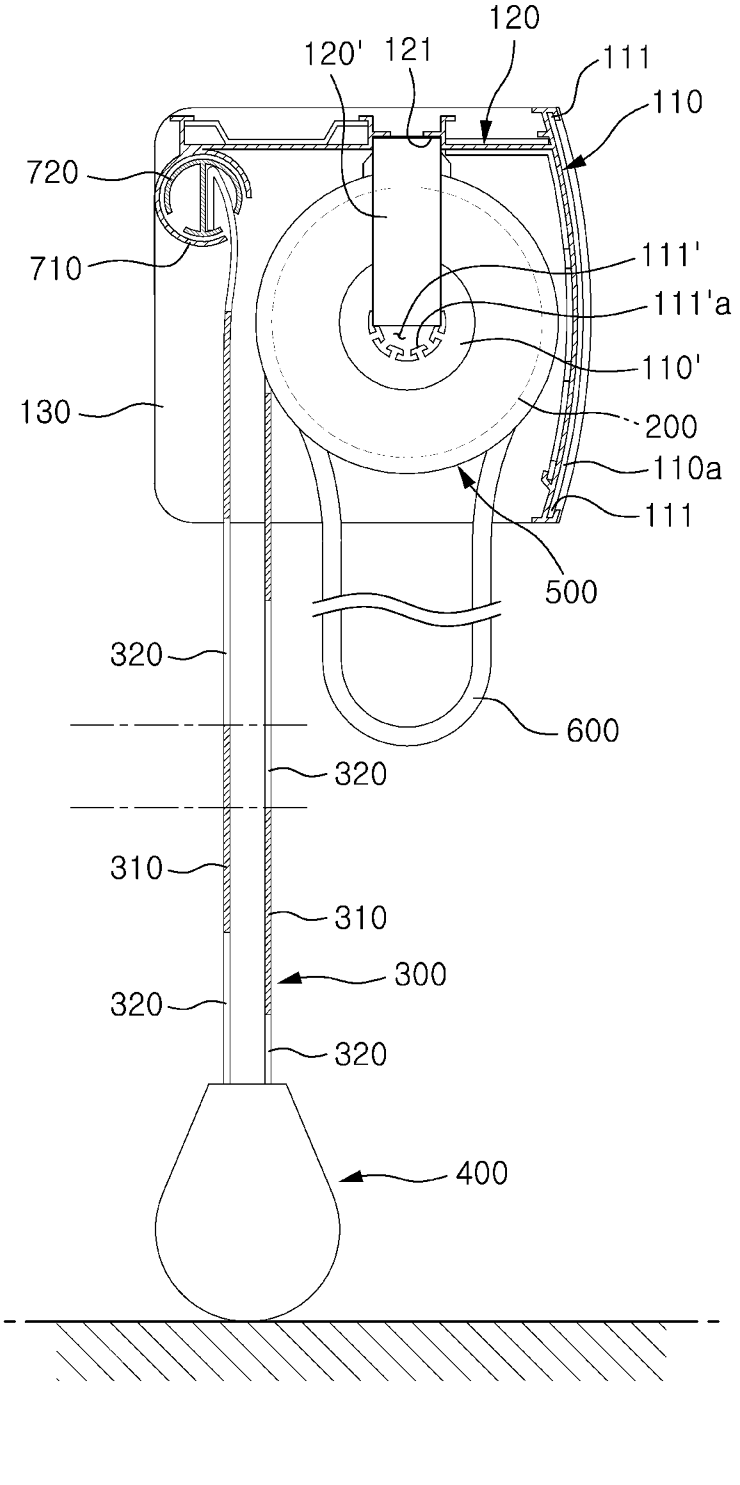
FIG. 6 and FIG. 7 a diagrams illustrating usage states of the combination roller blind with a fine adjustment function for shading according to the present invention, wherein the blind sheet is fine-adjusted so that the light-transmissive sections and the light blocking sections overlap.
Figure 7:
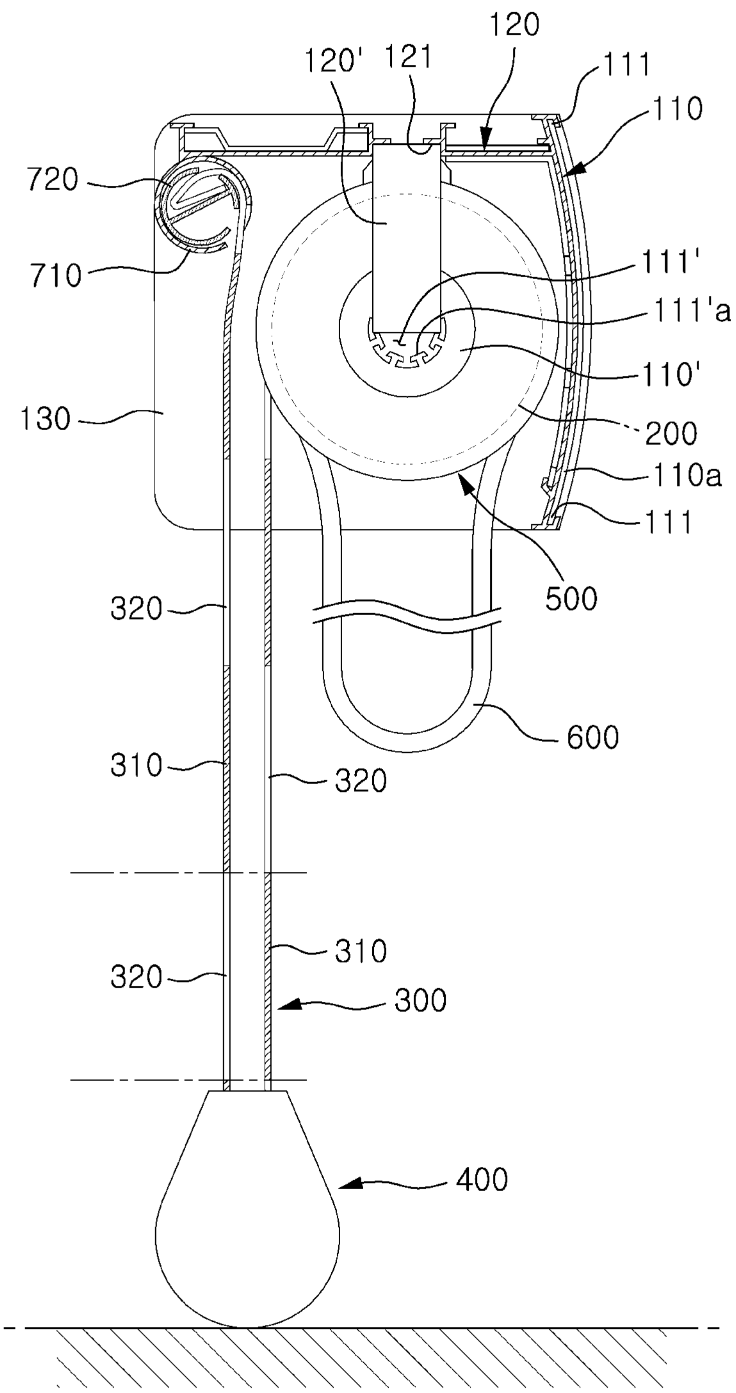

FIG. 6 and FIG. 7 are diagrams illustrating usage states of the combination roller blind with a fine adjustment function for shading according to the present invention, wherein the blind sheet is fine-adjusted so that the light-transmissive sections and the light blocking sections overlap.

As seen in FIGS. 1 through 7, the combination roller blind with a fine adjustment function for shading according to the present invention according to a preferred embodiment of the present invention allows fine rolling adjustment of an opposite end of a blind sheet wound around a blind roll, and is roughly comprised of a headrail 100, a blind roll 200, a blind sheet 300, a weight 400, a fine-adjusting means, a roller 500 and an adjusting cord 600.

Specifically, the upper face of the headrail 100 is fixedly installed on a ceiling or a window frame and formed by a front portion 110 and an upper portion 120 of certain length and width joined at a right angle, and the open side faces are sealed by inserting a side cover 130.

Further, the ends of the blind roll 200 are rotatably fixed to a pair of fixed axes 110', where one side of each axis is fixed in place by a bottom end of a fixed frame 120' whose top end is fixed to the upper portion 120.

On the blind sheet 300, light-transmissive sections 310 and light-blocking sections 320 are formed alternatingly in a lengthwise direction, and one end is fixed to the blind roll 200 for winding or unwinding, and the other end is fine-adjustably fixed to a rearward face of the upper portion of the headrail 100 to allow winding or unwinding.

Here, the light-transmissive sections 310 are preferably mesh.

Meanwhile, the weight 400 is installed at a U-shaped bottom curve of the blind sheet 300 and guides the rising of the blind sheet 300 and maintains tension thereof when the blind roll 200 is rotated.

The weight 400 is comprised of a bottom rod 410 which is wrapped around by the U-shaped bottom curve of the blind sheet 300, a bottom bar 420 which is disposed to wrap around the bottom rod 410 wrapped around by the U-shaped bottom curve of the blind sheet 300 excluding a certain width on the top, and caps 430 assembled to either side of the bottom bar to allow both ends of the bottom rod to rotate freely.

Here, preferably, the bottom bar 420 is provided as a bar having gradually increasing thickness from either open top end toward the closed bottom midsection.

Further, in the weight 400, the bottom rod 410 is fixedly installed inside the bottom bar 420 using caps 430 so that both ends can rotate freely.

Also, the fine-adjusting means which is installed to span the rearward face of the upper portion of the headrail and a side cover 130 of any one side, and the opposite end of the blind sheet 300 is fixed thereto and is wound or unwound to be rotated a certain distance to fine-adjust the blind sheet 300 so that a state wherein some of the light-transmissive sections 310 overlap becomes a state wherein [the light-transmissive sections] do not overlap.

Further, the roller 500 is assembled to wrap around a fixed axis 110' provided on the other side of the head rail 100 to which a side cover 130 is assembled, and rotates the blind roll 200 to move the blind sheet 300.

The roller 500 is comprised of elements identical to those of a typical combination roller blind, including a rotating ring (not illustrated) to which a top hooked portion of the adjusting cord 600 which is fixed and which is rotated when the adjusting cord 600 is pulled, in turn rotating the blind roll 200, and a supporting cover (not illustrated) which wraps around and protects the rotating ring, and the like. Therefore, further explanation in detail will be omitted in the following.

Further, the adjusting cord 600 is provided as a loop-type cord which wraps around the circumference of the roller 500, and the forward or rearward section thereof is pulled down to rotate the roller 500 to raise or lower the blind sheet 300.

Meanwhile, in the combination roller blind with a fine adjustment function for shading according to the present invention which is comprised of the above-described elements, the essential element of the fine-adjusting means is installed to span the rearward face of the upper portion 120 of the headrail 100 and a side cover 130 of any one side, and is comprised of an adjustment housing 710, a fine-adjustable winding bar 720, an adjusting hole 730 and a fine-adjusting tool 740.

Specifically, the adjustment housing 710 is provided as a hollow tube whose upper edge is fixed to a rear section of the upper portion of the headrail 100, and on which a downward-inclined lower portion facing the front portion 110 of the headrail 100 is cut out over a certain distance in a circumferential direction.

Further, the fine-adjustable winding bar 720 is provided as a hollow tube whose internal space is divided into two parts, each divisional space having a cut-out 721 in communication with the outside, where a certain length of the opposite end of the blind sheet 300 is fixed by insertion into the cut-out 721 on any one side, and which is rotated to wind or unwind the opposite end of the blind sheet 300.

Also, the adjusting hole 730 is penetratingly formed through a rearward top corner of a side cover 130 on any one side in communication with the internal space of the adjustment housing 710.

Further, the fine-adjusting tool 740 is fixed by insertion into the adjusting 730 hole so that one end is inserted into the divisional space of the fine-adjustable winding bar 720 opposite the space into which the opposite end of the blind sheet 300 is inserted, and which is detached from the adjusting hole 730 by a certain length and rotated to cause the fine-adjustable winding bar 720 to rotate in interlock.

In the fine-adjusting means which is comprised of the above-described elements, it is particularly important that rotation of the fine-adjusting tool 740 is prevented after it has been rotated.

This this end, the fine-adjusting tool 740 is comprised of an insertion piece 741 which is provided as an arc-shaped projection which is inserted into the divisional space of the fine-adjustable winding bar 720 opposite the space into which the opposite end of the blind sheet 300 is inserted; and an adjusting portion 745 comprised of a disc-shaped separator 746 which is formed integrally to extend outward from the cylindrical shape at one end of the insertion piece 741 and have a height difference from the opposite end of the insertion piece 741. Preferably, gear projections 747 are formed on the outer face of the cylindrical shape on one end of the adjusting portion 745.

Further, gear grooves 737 are preferably formed on the inner face of the adjusting hole 730 so that when the fine-adjusting tool 740 is inserted, [the gear grooves] mesh with the gear projections 747 of the adjusting portion 745.

Further, it is important that the fine-adjusting means which is comprised of the above-described elements can be readily pulled out of the fine-adjusting tool 740 by a certain length.

Accordingly, the adjusting hole 730 preferably has a depressed tool insertion groove 731 of a certain width on one side, into which a tool is inserted.

Meanwhile, in the combination roller blind with a fine adjustment function for shading according to the present invention, which is comprised of the above-described elements, the headrail 100 may have fastening rails 113 formed on the top and bottom of the front face of the front portion 110, with a patterned sheet **110*a* fastened to the front face of the front portion 110**.

By providing the above-described fastening rail 113, it is possible to install any of a variety of patterned sheets on the front portion 110 of the headrail 100, for example a patterned sheet having a pattern identical or similar to the light-blocking sections 320 of the blind sheet 300.

Further, in the combination roller blind with a fine adjustment function for shading according to the present invention, which is comprised of the above-described elements, the fixed frame 120' is preferably provided as a ⊏-shaped frame whose upper portion is secured in place by inserting into a fixing slot provided in the middle of the upper portion 120 of the headrail 100 in a widthwise direction, with the bottom portion secured in place by inserting between a multiplicity of inward-projecting fixed projections **111*a*' formed on an inner face of an assembly hole 111' formed in the center of the fixed axis 110'**.

Here, a multiplicity of fixed projections **111*a*' project inwardly in a circumferential direction on the inner face of the assembly hole 111'**, more preferably projecting to form a "T" shape as illustrated in the drawings.

Further, preferably, the side cover 130 has an oblong shape corresponding to the shape of the vertical portion of the fixed frame 120', and has a depressed accommodating groove 131 depressed to a certain depth on the face thereof which is assembled facing the headrail 100.

Moreover, a multiplicity of inserting projections (not illustrated) are further formed on the two planes corresponding to the front portion 110 and upper portion 120 of the headrail 100 on the side on which the accommodating groove 131 is formed, and using this multiplicity of inserting projections (not illustrated), the side cover 130 may be conveniently installed and secured in either open end of the headrail 100 by force without requiring the use of screw bolts and the like.

Further, in the combination roller blind with a fine adjustment function for shading according to the present invention, which is comprised of the above-described elements, the blind sheet 300 is preferably provided as a loop whose front and rear parts are separated by a distance of 8.3 to 9.3 mm by the weight 400, and more preferably by a distance of 8.7 mm.

By providing the blind sheet 300 with the front and rear parts separated by a distance of 8.7 mm as described above, when the front and rear parts of the blind sheet 300 can move stably without friction therebetween when being wound or unwound by rotation of the blind roll 200, and thereby, the useful life of the blind sheet 300 can be improved further.

According to the combination roller blind with a fine adjustment function for shading according to the present invention, which is comprised of the above-described elements, by providing a fine adjustment means behind an upper face of a headrail, the adjustment means causing an end of a blind sheet wrapped around a blind roll and an end opposite thereof to be fine-adjustably wrapped and unwrapped, when [the blind] is installed on a ceiling or a window frame to completely conceal the bottom edge of the window so that a bottom edge of a weight is adjoining a bottom sill of the window frame and a portion of a light-transmissive section of the blind sheet is not overlapped, the opposite edge wrapped around the blind roll of the blind sheet can be fine-adjusted by rolling so that the light-transmissive section alternates with and is not completely overlapped by a light blocking section, allowing for complete shading to be achieved while completely concealing the bottom edge of the window.

Furthermore, by allowing the opposite edge of the blind sheet wrapped around the blind sheet to be fine-adjusted, a blind may be installed on window frames having varying lengths so that complete shading can be achieved when a weight is moved down to its lowest extent, maximizing compatibility with installation sites.

Figure 8:
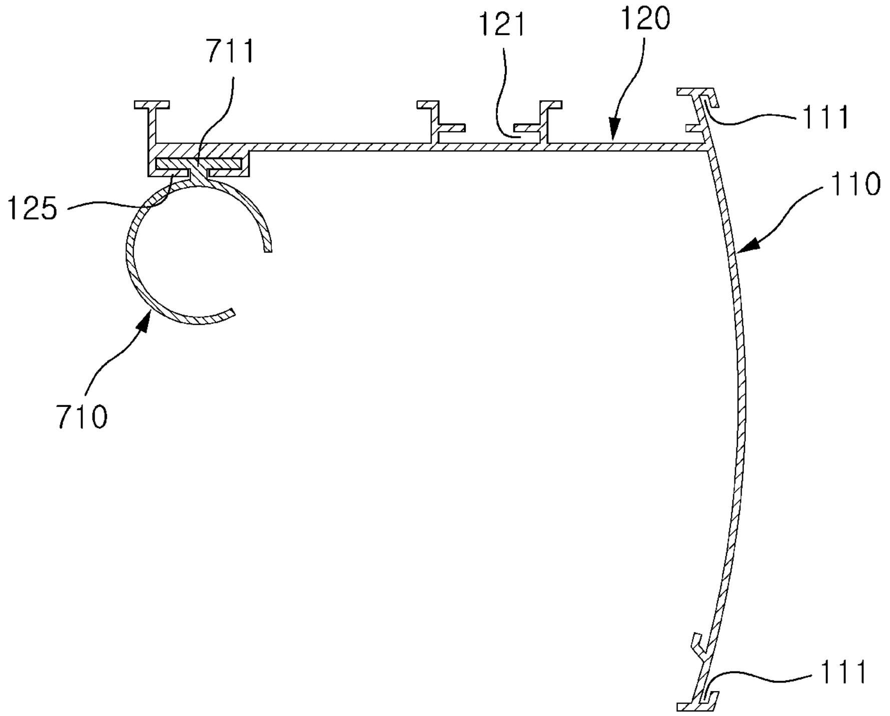
FIG. 8 is an exemplary diagram of essential elements of another embodiment, wherein the adjustment case which is an essential element has a detachable structure.

FIG. 8 is an exemplary diagram of essential elements of another embodiment of the combination roller blind with a fine adjustment function for shading according to the present invention, wherein the adjustment case which is an essential element has a detachable structure.

As illustrated in FIG. 8, the embodiment wherein the adjustment case has a detachable structure, the adjustment housing 710 is provided detachably to allow for storage separately from the headrail 100, maximizing efficiency of storage.

Referring to FIG. 8, in the detachable adjustment case structure according to another embodiment, a fixing rail 125 is formed beneath and behind the upper portion of the headrail 100.

Further, the adjustment housing 710 has a "T"-shaped fastening piece 711 formed on the top and which is fastened by sliding into the fixing rail 125 of the upper portion 120, so that it may be separably fastened to the upper portion 120 of the headrail 100 through the fixing rail 125.

Whereas specific embodiments of the present invention have been described in detail in the foregoing, the present invention is not limited thereto. The present invention may be modified in various ways by persons skilled in the art, the such modifications are included in the scope of the present invention.

[Explanation of Symbols]

| | | | |
|---|---|---|---|
| 100: | Headrail | 110: | Front portion |
| 111: | Front slot | 113: | Fastening rail |
| 110a: | Patterned sheet | 120: | Upper portion |
| 121: | Fixing slot | 125: | Fixing rail |
| 130: | Side cover | 131: | Accommodating groove |
| 110': | Fixed axis | 111': | Assembly hole |
| 111a': | Fixed projection | 120': | Fixed frame |
| 200: | Blind roll | 300: | Blind sheet |
| 310: | Light-transmissive section | 320: | Light-blocking section |
| 400: | Weight | 410: | Bottom rod |
| 420: | Bottom bar | 430: | Cap |
| 500: | Roller | 600: | Adjusting cord |
| 710: | Adjustment housing | 711: | Fastening piece |
| 720: | Find-adjustable winding bar | 721: | Cut-out |

-continued

[Explanation of Symbols]

| | | | |
|---|---|---|---|
| 730: | Adjusting hole | 731: | Tool insertion groove |
| 737: | Gear groove | 740: | Fine-adjusting tool |
| 741: | Insertion piece | 745: | Adjusting portion |
| 746: | Separator | 747: | Gear projection |

The invention claimed is:

1. A combination roller blind with a fine adjustment function for shading comprised of:

a headrail whose upper face is fixedly installed on a ceiling or a window frame and formed by a front portion and an upper portion of certain length and width joined at a right angle, wherein open side faces of the headrail are sealed by inserting side covers;

a blind roll whose ends are rotatably fixed to a pair of fixed axes, where an axis end of each of the axis is fixed in place by a bottom end of a fixed frame whose top end is fixed to the upper portion of the headrail;

a plurality of light-transmissive sections and a plurality of light-blocking sections are formed alternatingly in a lengthwise direction on a blind sheet, wherein one end of the blind sheet is fixed to the blind roll for winding or unwinding, and the other end of the blind sheet is fine-adjustably fixed to a rearward face of the upper portion of the headrail to allow winding or unwinding;

a weight installed at a U-shaped bottom curve of the blind sheet guides the rising of the blind sheet and maintains tension thereof when the blind roll is rotated;

a fine-adjusting means installed to span the rearward face of the upper portion of the headrail, the other end of the blind sheet fixed there to, wherein the fine-adjusting means to be wound or unwound and be rotated a certain distance to fine-adjust the blind sheet so that one or more of the light-transmissive sections overlap and then one or more of the light transmissive sections do not overlap as the fine-adjusting means is wound or unwound;

a roller assembled to wrap around the fixed axes to rotate the blind roll to move the blind sheet; and an adjusting cord is provided as a loop-type cord which wraps around the circumference of the roller to raise or lower the blind sheet, wherein the fine-adjusting means is comprised of:

an adjustment housing is provided as a hollow tube whose upper edge is fixed to a rear section of the upper portion of the headrail, and on which a downward-inclined lower portion facing the front portion of the headrail is cut out over a certain distance in a circumferential direction;

a fine-adjustable winding bar is provided as a hollow tube whose internal space is divided into two parts, each internal space of the two divided parts of the fine-adjustable winding bar has a cut-out, wherein a certain length of the blind sheet is fixedly inserted into either of the cut-outs so that the fine-adjustable winding bar may be rotated to wind or unwind the blind sheet around the fine-adjustable winding bar;

an adjusting hole penetratingly formed through a rearward top corner of one of the side covers communicates with the internal space of the adjustment housing; and a fine-adjusting tool fixedly inserted into the adjusting hole such that one end of the fine-adjusting tool is inserted into the internal space of one of the divided parts of the fine-adjustable winding bar opposite the space into which the blind sheet is inserted, and the fine-adjusting tool is detached from the adjusting hole by a certain length and rotated to cause the fine-adjustable winding bar to rotate in interlock.

2. The combination roller blind with a fine adjustment function for shading of claim 1 wherein, to prevent rotation of the fine-adjusting tool after it has been rotated, the fine-adjusting tool has an insertion piece which is an arc-shaped projection inserted into at least one of the internal space of the two divided parts;

and an adjusting portion comprised of a disc-shaped separator which is formed integrally to extend outward from the arc-shaped projection and the adjusting portion has one or more of gear projections, and wherein one or more gear grooves are formed on the inner face of the adjusting hole so that when the fine-adjusting tool is inserted, one or more of the gear grooves interlock with the gear projections of the adjusting portion.

3. The combination roller blind with a fine adjustment function for shading of claim 1, wherein the fine-adjusting tool may be pulled out by a certain length from the adjusting hole, sliding on a depressed tool insertion groove located adjacent to the adjusting hole.

4. The combination roller blind with a fine adjustment function for shading of claim 1, wherein the weight is comprised of:

a bottom rod that is wrapped around the U-shaped bottom curve of the blind sheet;

a bottom bar wraps around the bottom rod;

and caps assembled on either side of the bottom bar, allowing both ends of the bottom rod to rotate freely and holding the bottom rod in place between the caps, and the bottom bar has gradually increasing thickness from a top end toward a closed bottom.

5. The combination roller blind with a fine adjustment function for shading of claim 1, wherein the headrail has fastening rails 113 formed placed on a top and bottom of the front portion.

6. The combination roller blind with a fine adjustment function for shading of claim 1, wherein the fixed frame is provided as a ⊏-shaped frame whose upper portion is secured in place by inserting into a fixing slot provided in the middle of the upper portion of the headrail in a widthwise direction, with the bottom portion of the fixed frame secured in place by inserting between a plurality of inward-projecting fixed projections formed on an inner face of an assembly hole formed in a center of the fixed axes;

and each of the side covers has an oblong shape corresponding to the shape of a vertical portion of the fixed frame, and has a depressed accommodating groove depressed to a certain depth on a face thereof which is assembled facing the headrail.

7. The combination roller blind with a fine adjustment function for shading of claim 1, wherein a fixing rail is formed beneath and behind the upper portion of the headrail, and the adjustment housing has a "T"-shaped fastening piece formed on a top thereof which is removably fastened to the fixing rail by sliding the head rail into the fixing rail.

* * * * *